(No Model.)
O. W. SCHAUM.
BRAKE MECHANISM.
No. 407,615. Patented July 23, 1889.
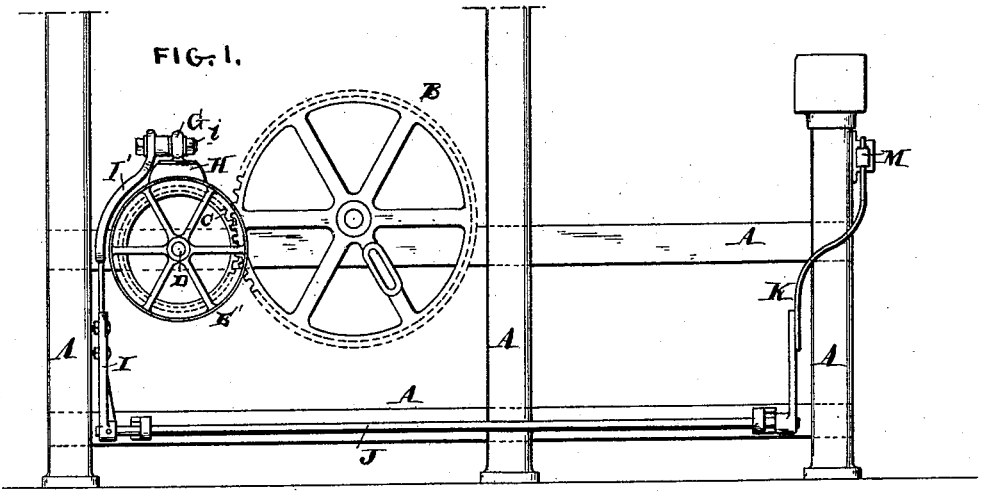
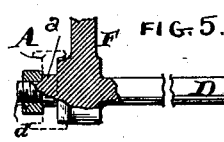
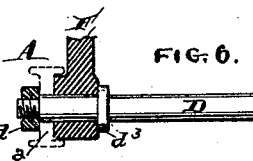
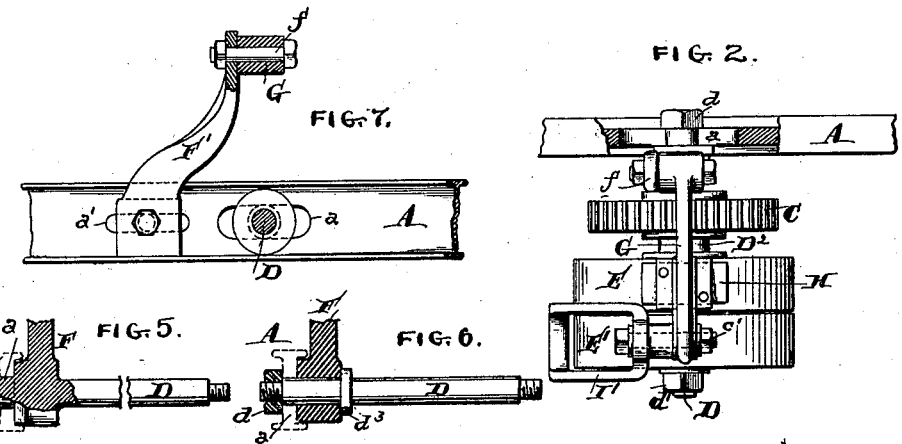
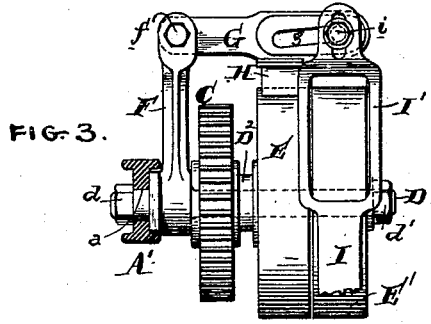
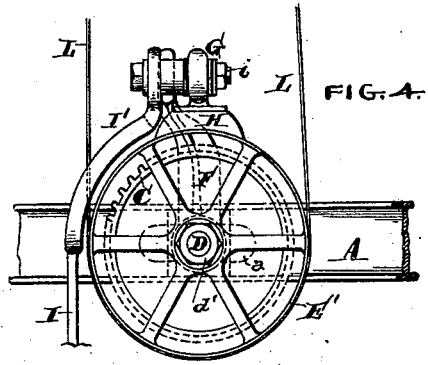
WITNESSES:
Henry Drury
David G. Williams
INVENTOR:
Otto W. Schaum
by his attorney
Francis T. Chambers

UNITED STATES PATENT OFFICE.

OTTO W. SCHAUM, OF PHILADELPHIA, PENNSYLVANIA.

BRAKE MECHANISM.

SPECIFICATION forming part of Letters Patent No. 407,615, dated July 23, 1889.

Application filed May 13, 1889. Serial No. 310,553. (No model.)

*To all whom it may concern:*

Be it known that I, OTTO W. SCHAUM, of the city and county of Philadelphia, State of Pennsylvania, have invented a new and useful Improvement in Brake Mechanism, of which the following is a true and exact description, reference being had to the accompanying drawings, which form a part of this specification.

My invention relates especially to the brake mechanism used in combination with the driving-gear of ribbon-looms, though it is of course fitted for use with any analogous mechanism. In machinery of this kind as heretofore constructed it has been used to secure the fast pulley together with the driving-pinion upon a sleeve, which sleeve and the loose pulley were journaled upon a stud-like shaft secured at one end to the frame of the loom and adjustable to and from the main gear-wheel of the loom, so as to enable driving-pinions of different size to be used, (a change in the pinion being necessary where different widths of ribbon are to be made, so as to change the speed;) and in order to insure the stoppage of the loom as soon as the belt was shifted from the fast to the loose pulley a brake-shoe has been suspended over the fast pulley and so connected with the belt-shifter as to be applied to said pulley at the same time that the belt was shifted from it.

All the above features I retain in my device, and the principal novel feature of my new construction consists in securing the standard to which the brake is attached upon the same stud-shaft which supports the pulleys and driving-pinion, so that the relative position of the fast pulley and the brake remain always the same, irrespective of any movement of the stud-shaft or change of driving-pinion, while in earlier constructions the brake-standard was secured to the frame and had to be carefully adjusted whenever the stud-shaft was moved. Preferably I form the brake-standard and stud-shaft of the same casting, though they may be detachably secured together, reference being now had to the drawings which illustrate my invention, and in which—

Figure 1 is a side elevation of the driving mechanism of a ribbon-loom, showing the parts of the loom-frame to which it is attached. Fig. 2 is a plan view of said mechanism; Fig. 3, a front view; Fig. 4, an enlarged side view of the fast pulley, the brake, and belt-shifter; Fig. 5, a view partly in section, showing my preferred mode of forming the stud-shaft and brake-standard of one casting. Fig. 6 is a modified construction, and Fig. 7 a side view showing the older construction upon which my device is an improvement.

A is the loom-frame, to which the stud-shaft is secured, $a$ being the slot through which the said shaft passes and in which it can move, while $a'$, Fig. 7, shows a similar slot in which with the older mechanism the brake-standard was adjusted in a similar way.

B is the main driving-wheel of the loom proper. It is provided with teeth which engage the teeth of the driving-pinion C. This pinion it is necessary to frequently change, and it is detachably secured to a sleeve $D^2$, which extends out from the fast pulley E, and the fast pulley having this sleeve, together with the loose pulley E', is journaled upon the stud-shaft D, which is secured in slot $a$ by a nut $d$.

$d'$ is a nut which serves to keep the pulleys on the shaft D.

F is the brake-standard, which I preferably form of the same casting as the stud-shaft D, as is shown in Fig. 5, but which may be detachably secured to said shaft in any convenient way—as, for instance, as shown in Fig. 6, where it is clamped between a collar $d^3$ on shaft D and the frame A around slot $a$. The plan of forming the shaft and standard of a single malleable casting is, however, much better than any detachable arrangement, as it is important that these parts should be strong and relatively immovable. On a pivot $f$ at the top of standard F is secured a link G, having an inclined slot $g$ formed in it, and the brake H attached to it, as shown, so as to lie directly over the fast pulley E.

I is the standard of the belt-shifter I', which is of usual construction, and has a stud $i$ secured in its head and in the slot $g$ of pivoted link G. The standard I is attached to a rock-shaft J, which may be actuated in any desired manner—as, for instance, by a lever K, actuated by a reciprocating bar M. L, Fig. 4, shows the driving-belt, and Fig. 7, as already explained, represents the construction upon which my invention is an improvement, the brake-standard being here marked F'.

The operation of the device is as follows: A driving-pinion C, of the desired size, having been secured upon the sleeve $D^2$, and the pulleys E and E', together with the driving-pinion attached to the sleeve of the fast pulley E, placed upon the stud-shaft D, the nut d' is screwed upon the end of the stud-shaft to hold the pulleys in position, and the other end of the said stud-shaft attached to the frame of the machine, as by inserting the end in a slot a, formed in frame A, and screwing on the nut d, which clamps the said stud-shaft to the frame. Before clamping the stud-shaft to the frame it is of course moved into such position as will enable the driving-pinion C to engage with the main driving-gear B, and it is of course obvious that where the brake-standard is attached to the stud-shaft, as shown, the brake H, which is attached to the link G, will always remain in the same relative position to the driving-pulley E, while in the older construction illustrated in Fig. 7 it was necessary to adjust the brake-stud (here designated by the letter F') whenever the driving-pinion was changed and a new adjustment of the stud-shaft made. The parts having been secured in proper position and the belt L set in operation, the belt-shifter I' being thrown so as to engage the belt with the loose pulley E', its pin i will be in the position shown in Fig. 3 and the brake H pressed down upon the fast pulley E. To start the driving-pinion, the shifter is, by means of the rock-shaft J, moved to the left in Fig. 3, so as to bring the belt on the fast pulley E. The pin i, moving in the inclined slot g, will push the link G upward and raise the brake H above the surface of the driving-pulley, which will then be free to turn, and will, by means of the sleeve $D^2$, actuate the driving-pinion C and through it the main driving-wheel B of the loom; and it is of course obvious that as soon as the shifter thrusts the belt off of the driving-pulley onto the loose pulley its pin i will press the link G and the brake H down upon the driving-pulley, thus stopping the motion of the machine as soon as the driving-power is removed from it.

Having now described my invention, what I claim as new, and desire to secure by Letters Patent, is—

1. In brake mechanism, substantially as described, the combination of a movable stud-shaft adapted to support a fast and loose pulley, and a driving pinion with a brake-supporting standard connected directly with said stud-shaft, all substantially as and for the purpose specified.

2. In brake mechanism, substantially as described, the combination of a movable stud-shaft adapted to support a fast and loose pulley, and a driving-pinion with a brake-supporting standard formed integral with said stud-shaft, all substantially as and for the purpose specified.

OTTO W. SCHAUM.

Witnesses:
GEORGE HOUSE,
JOSHUA MATLACK, Jr.